(12) United States Patent
Yamasaki

(10) Patent No.: US 11,613,155 B2
(45) Date of Patent: Mar. 28, 2023

(54) AIR-CONDITIONING UNIT

(71) Applicant: DENSO CORPORATION, Kariya (JP)

(72) Inventor: Hiromu Yamasaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 108 days.

(21) Appl. No.: 16/788,776

(22) Filed: Feb. 12, 2020

(65) Prior Publication Data

US 2020/0180389 A1 Jun. 11, 2020

Related U.S. Application Data

(63) Continuation of application No. PCT/JP2018/028141, filed on Jul. 26, 2018.

(30) Foreign Application Priority Data

Aug. 30, 2017 (JP) .............................. JP2017-165846

(51) Int. Cl.
  *B60H 1/00* (2006.01)
  *B60H 1/34* (2006.01)
  *B60S 1/02* (2006.01)

(52) U.S. Cl.
  CPC ....... *B60H 1/00057* (2013.01); *B60H 1/3407* (2013.01); *B60S 1/023* (2013.01);
  (Continued)

(58) Field of Classification Search
  CPC .............. B60H 1/0005; B60H 1/00057; B60H 1/00035; B60H 1/005; B60H 1/00671;
  (Continued)

(56) References Cited

U.S. PATENT DOCUMENTS 5,967,224 A * 10/1999 Iwanaga ............ B60H 1/00021
  165/80.3
8,573,286 B2 * 11/2013 Domes .................. F28D 7/1692
  165/146

(Continued)

FOREIGN PATENT DOCUMENTS

DE 10121286 A1 * 10/2002 ......... B60H 1/00028
DE 10304548 A1 * 7/2004 ........... B60H 1/3407
(Continued)

OTHER PUBLICATIONS

Darby, Ron. Chemical Engineering Fluid Mechanics. CRC Press, 1996. EBSCOhost (Year: 1996).*
(Continued)

*Primary Examiner* — Jenna M Hopkins
(74) *Attorney, Agent, or Firm* — Harness, Dickey & Pierce, P.L.C.

(57) ABSTRACT

An air-conditioning unit includes an air-conditioning case including an opening through which air flows, a cooler disposed in the air-conditioning case to cool air flowing to the opening, a heater disposed in the air-conditioning case to heat air flowing to the opening, and an adjusting member disposed to cover the opening and adjusting airflow passing through the opening. The adjusting member is produced separately from the air-conditioning case and includes a first region and a second region. The second region includes a high resistance member giving higher resistance to the airflow than the first region. The first region includes a low resistance member giving lower resistance to the airflow than the second region. The low resistance member is a partition dividing the first region into plural air passing parts through which air flows. The high resistance member is a plate member including a part to interfere the airflow.

7 Claims, 12 Drawing Sheets

(52) U.S. Cl.
CPC .............. *B60H 2001/00078* (2013.01); *B60H 2001/00135* (2013.01)

(58) Field of Classification Search
CPC ............ B60H 1/00664; B60H 1/00864; B60H 1/00871; B60H 1/00878; B60H 1/00892; B60H 1/242; B60H 2001/00214; B60H 2001/00721; B60H 2001/00092; B60H 2001/2281; B60H 1/34; B60H 2001/00078; B60H 2001/000135; B60H 1/00021; B60H 1/0055; B60H 1/3407
See application file for complete search history.

(56) References Cited

U.S. PATENT DOCUMENTS

| | | |
|---|---|---|
| 2001/0034170 A1 | 10/2001 | Keese |
| 2004/0159420 A1 | 8/2004 | Goupil et al. |
| 2005/0170722 A1 | 8/2005 | Keese |
| 2005/0202773 A1 | 9/2005 | Arold |
| 2005/0282023 A1 | 12/2005 | Comeaux et al. |
| 2006/0116064 A1* | 6/2006 | Umebayashi ........ B60H 1/3407 454/143 |
| 2009/0038774 A1* | 2/2009 | Ogiso .................... B60H 1/245 165/42 |
| 2015/0038067 A1* | 2/2015 | Byon ................ B60H 1/00021 454/160 |

FOREIGN PATENT DOCUMENTS

| | | | | |
|---|---|---|---|---|
| DE | 10331398 A1 | * | 1/2005 | ........... B60H 1/3407 |
| DE | 102004003196 A1 | | 8/2005 | |
| DE | 102004057316 A1 | * | 6/2006 | ........... B60H 1/3407 |
| DE | 102006009577 A1 | | 9/2007 | |
| DE | 102006026655 A1 | * | 12/2007 | ........... B60H 1/3407 |
| DE | 102008021015 A1 | | 10/2008 | |
| EP | 672551 A1 | * | 9/1995 | ........... B60H 1/3407 |
| FR | 2912085 A1 | * | 8/2008 | ............... B60H 1/34 |
| JP | S61145017 U | | 9/1986 | |
| JP | H05124432 A | | 5/1993 | |
| JP | H11-222020 A | | 8/1999 | |
| JP | 2006510548 A | | 3/2006 | |
| JP | 2006188193 A | | 7/2006 | |
| KR | 20040065885 A | | 7/2004 | |
| KR | 20060072432 A | | 6/2006 | |
| KR | 20100035984 A | * | 4/2010 | |
| WO | WO-2013037478 A1 | * | 3/2013 | ......... B60H 1/00021 |
| WO | WO-2013185012 A1 | * | 12/2013 | ........... B60H 1/3407 |

OTHER PUBLICATIONS

DE10121286A1 English Machine Translation (Year: 2002).*
DE 10304548 A1 English Machine Translation (Year: 2004).*
KR 1020100035984 A English Machine Translation (Year: 2010).*

* cited by examiner

FIG. 8

|  | COMPARISON EXAMPLE | SECOND EMBODIMENT | EFFECT |
|---|---|---|---|
| TEMPERATURE VARIATION IN AIR OUTLET | 6.7°C | 3.6°C | ▲3.1°C |
| TEMPERATURE VARIATION BETWEEN AIR OUTLETS | 6.0°C | 4.0°C | ▲2.0°C | ced
AIR-CONDITIONING UNIT

CROSS REFERENCE TO RELATED APPLICATION

The present application is a continuation application of International Patent Application No. PCT/JP2018/028141 filed on Jul. 26, 2018, which designated the U.S. and claims the benefit of priority from Japanese Patent Application No. 2017-165846 filed on Aug. 30, 2017. The entire disclosures of all of the above applications are incorporated herein by reference.

TECHNICAL FIELD

The present disclosure relates to an air-conditioning unit for a vehicle.

BACKGROUND ART

An air mix type air-conditioning unit has been known. The air-conditioning unit mixes a cool air generated at a cooler and a warm air generated at a heater to make a temperature conditioned air, and conveys the temperature conditioned air into a cabin of a vehicle.

SUMMARY

According to an aspect of the present disclosure, an air-conditioning unit includes an air-conditioning case including an opening through which air flows, a cooler disposed in the air-conditioning case to cool air flowing to the opening, a heater disposed in the air-conditioning case to heat air flowing to the opening, and an adjusting member disposed to cover the opening to adjust an airflow passing through the opening. The adjusting member is produced separately from the air-conditioning case. The adjusting member includes a first region through which air flows and a second region having larger resistance to the airflow than the first region. The second region includes a high resistance member giving higher resistance to the airflow than the first region. The first region includes a low resistance member giving lower resistance to the airflow than the second region. The low resistance member is a partition dividing the first region into plural air passing parts through which air flows. The high resistance member is a plate member including a part to interfere the airflow.

BRIEF DESCRIPTION OF DRAWINGS

FIG. 8 is a chart of measurement results of a temperature variation in an air outlet and a temperature variation between air outlets of air-conditioning units in each of the second embodiment and a comparison example.

DESCRIPTION OF EMBODIMENTS

Figure 1:
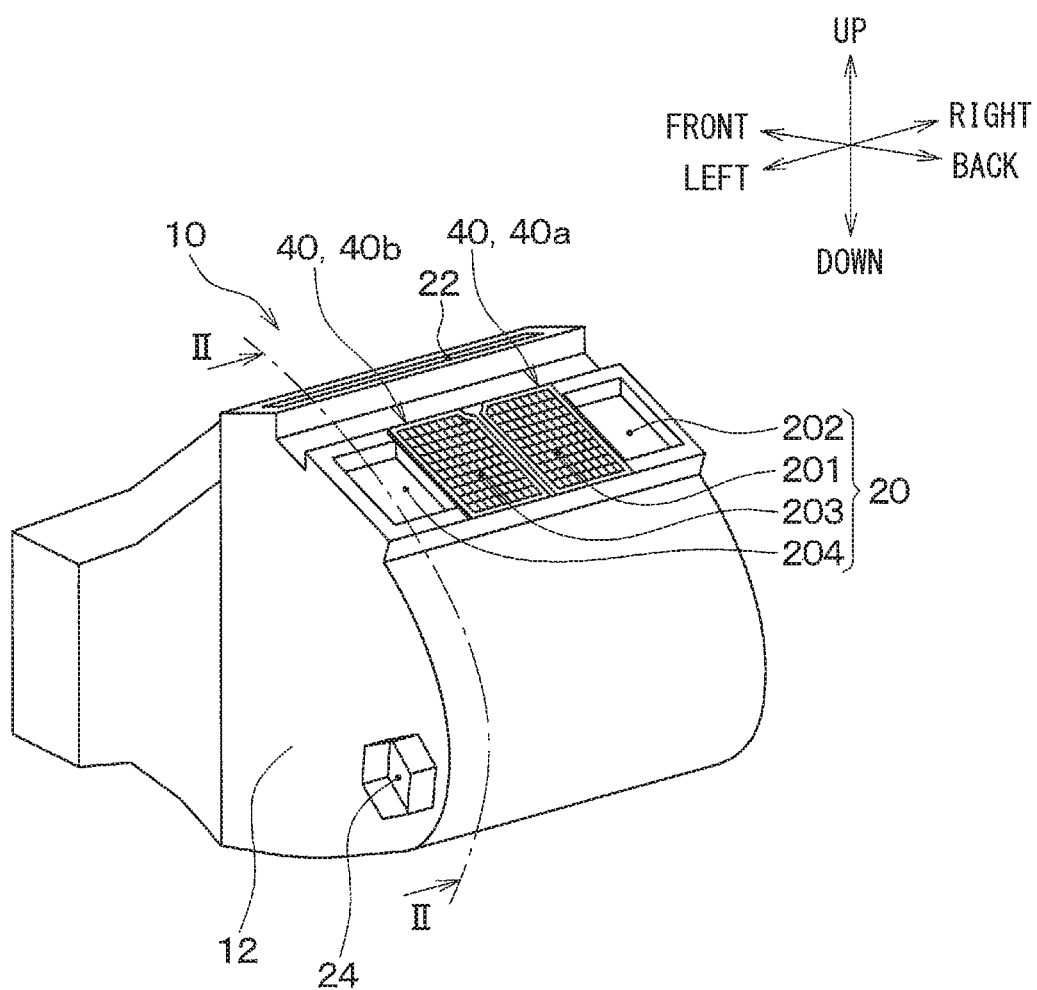
FIG. 1 is a perspective view of an air-conditioning unit in accordance with a first embodiment.

To begin with, examples of relevant techniques will be described.

An air mix type air-conditioning unit has been known. The air-conditioning unit mixes a cool air generated at a cooler and a warm air generated at a heater to make a temperature conditioned air, and conveys the temperature conditioned air into a cabin of a vehicle.

An air-conditioning unit is downsized, so that a space where a cool air and a warm air are mixed is downsized in the air conditioning unit. Thus, the warm air and the cool air are blown from an air outlet in a cabin of a vehicle without adequately mixing. As a result, a temperature of air blown from the air outlet includes large variation. In addition, when the space where the cool air and the warm air are mixed is small and when airs having the same temperature target are blown from plural air outlets, a temperature difference of airs blown from different air outlets is large. To say, the temperature variation of airs blown from different air outlets is large.

It is required for the air-conditioning unit to reduce a noise of the air blown from the air outlet into the cabin.

The present disclosure provides an air-conditioning unit that reduces a temperature variation of air blown from an air outlet and a temperature variation of airs blown from different air outlets. The present disclosure also provides the air-conditioning unit that reduces a noise of the blowing air.

According to an aspect of the present disclosure, an air-conditioning unit includes an air-conditioning case including an opening through which air flows, a cooler disposed in the air-conditioning case to cool air flowing to the opening, a heater disposed in the air-conditioning case to heat air flowing to the opening, and an adjusting member disposed to cover the opening to adjust an airflow passing through the opening. The adjusting member is produced separately from the air-conditioning case. The adjusting member includes a first region through which air flows and a second region having larger resistance to the airflow than the first region. The second region includes a high resistance member giving higher resistance to the airflow than the first region. The first region includes a low resistance member giving lower resistance to the airflow than the second region. The low resistance member is a partition dividing the first region into plural air passing parts through which air flows. The high resistance member is a plate member including a part to interfere the airflow According to this, the airflow passing through the opening is more disturbed compared to an air-conditioning unit without the adjusting member. Thus, when the warm air produced at the heater and the cool air produced at the cooler flow into the opening, the warm air and the cool air can be mixed by the adjusting member. This reduces the temperature variation of air blown from the air outlet.

By disposing the adjusting member to cover the opening, the resistance to the airflow can be adjusted. When the air-conditioning unit includes plural openings, at least one opening is covered with the adjusting member. Thus, mix ratios of the warm air and the cool air blown from the plural air outlets are regulated. The mix ratio of the warm air and the cool air is regulated such that the temperature variation between airs blown from different air outlets is reduced. Thus, the temperature variation of airs blown from different air outlets can be reduced.

Reference numerals with brackets added to each component element show an example of the correspondent between component elements and concrete component elements described in embodiments mentioned later.

Hereinafter, embodiments will be described according to the drawings. Same or equivalent portions among respective embodiments below are labeled with the same reference numerals in the drawings.

First Embodiment

Figure 2:
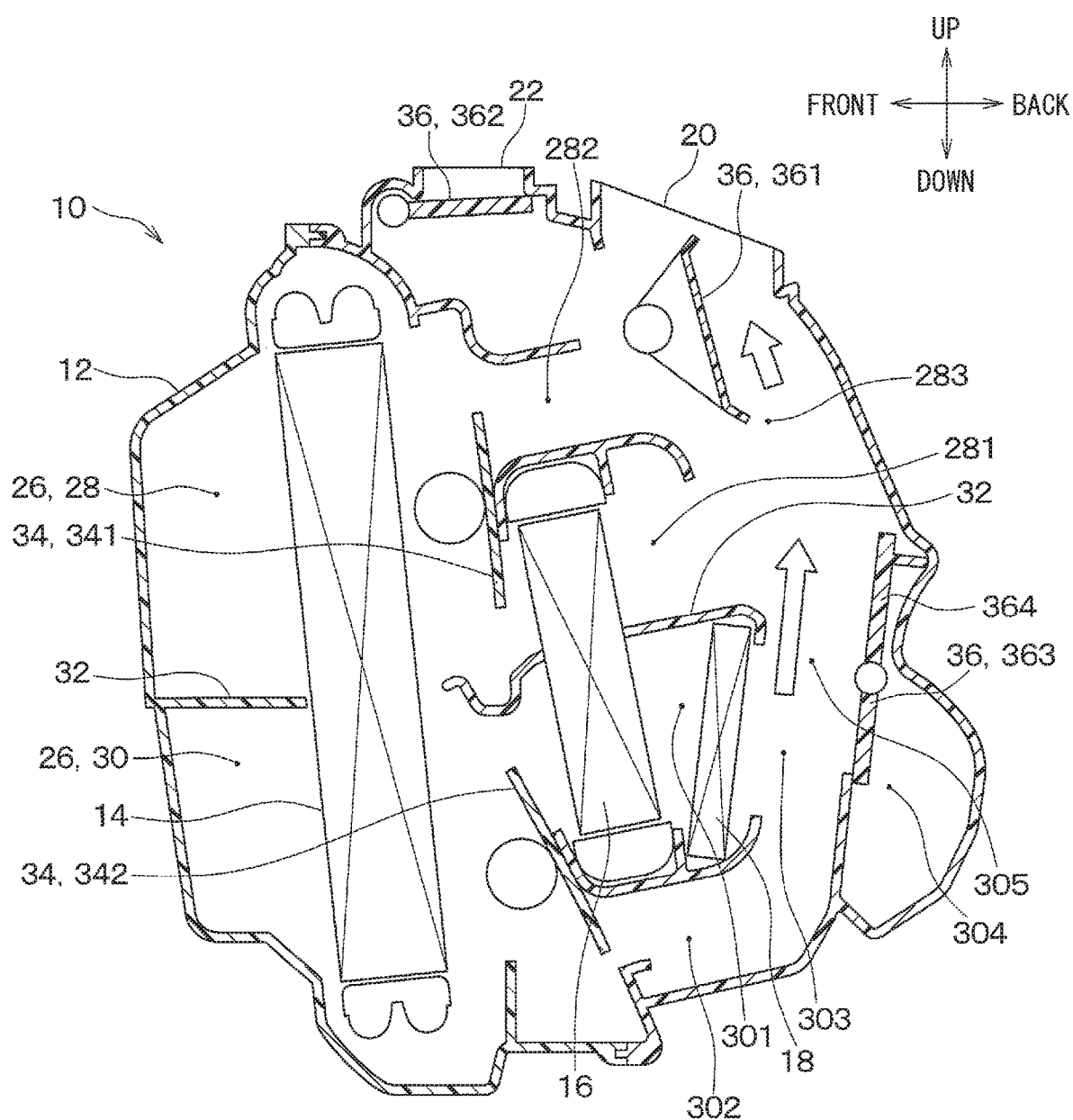
FIG. 2 is a cross-sectional view taken along a line II-II in FIG. 1.

A schematic structure of an air-conditioning unit 10 in a first embodiment of the present disclosure is shown in FIGS. 1 and 2. The air-conditioning unit 10 is an air-conditioning unit for a vehicle configuring a part of an air-conditioning device. The air-conditioning unit 10 is disposed forward a front seat in a cabin of the vehicle. Specifically, the air-conditioning unit 10 is disposed inside an instrument panel. The air-conditioning unit 10 conveys air having passed through a heat exchanger into the cabin.

The air-conditioning unit 10 includes an air-conditioning case 12, a blower (not shown), an evaporator 14, a heater core 16, and a PTC heater 18.

The air-conditioning case 12 configures an outer frame of the air-conditioning unit 10. As shown in FIG. 1, the air-conditioning case 12 includes plural openings 20, 22, and 24. The openings 20, 22, and 24 are openings through which air flows from an inside to an outside of the air-conditioning case 12. The openings 20, 22, and 24 include a face opening 20, a defroster opening 22, and a foot opening 24. The face opening 20 is connected to a face air outlet at the instrument panel (not shown) through a duct (not shown). The defroster opening 22 is connected to a defroster air outlet at the instrument panel (not shown) through a duct (not shown).

The face air outlet includes a driver center air outlet, a driver side air outlet, a passenger center air outlet, and a passenger side air outlet. The driver center air outlet and the driver side air outlet are disposed at a driver seat side of the instrument panel. The passenger center air outlet and the passenger side air outlet are disposed at a passenger seat side of the instrument panel. The driver center air outlet and the passenger center air outlet are disposed at a middle part of the instrument panel in a lateral direction of the vehicle. The driver side air outlet and the passenger side air outlet are disposed at outer parts of the instrument panel in the lateral direction of the vehicle.

Figure 3:
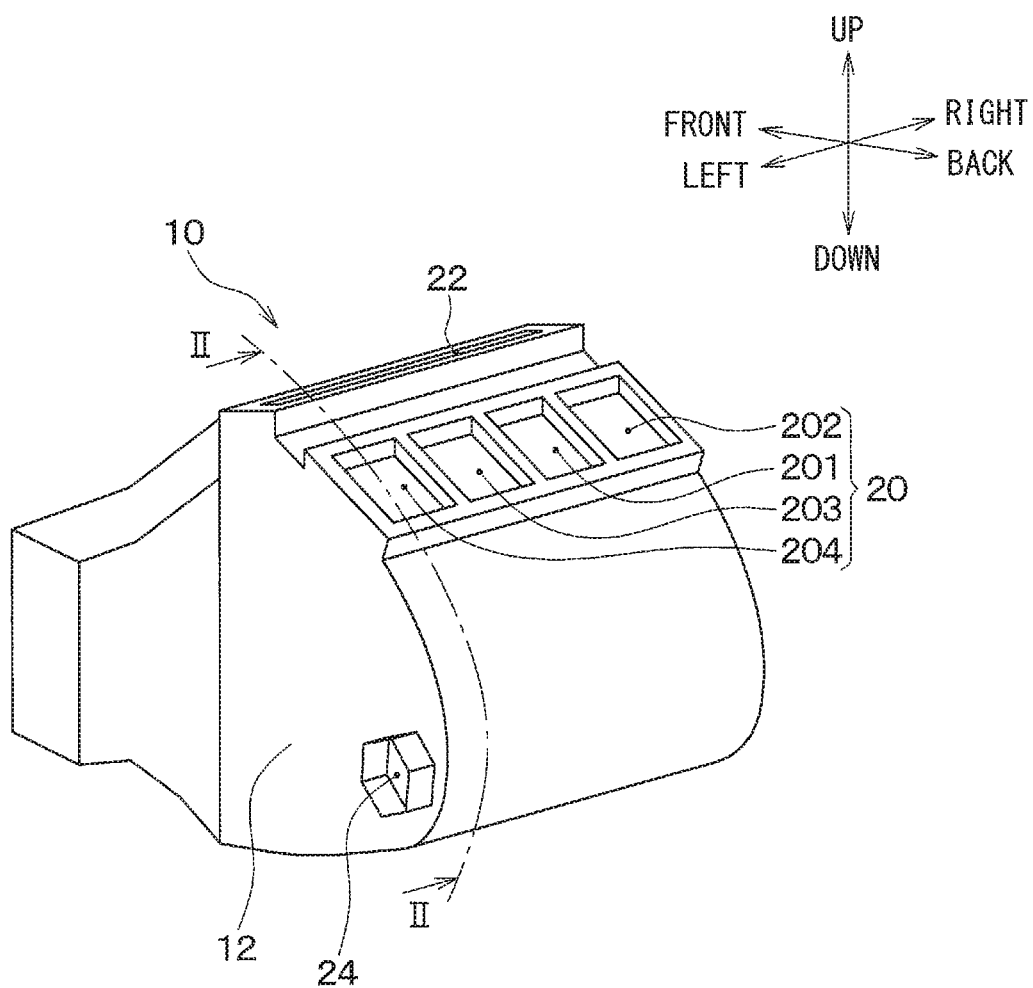
FIG. 3 is a perspective view of the air-conditioning unit in accordance with the first embodiment without an adjusting member.

As shown in FIGS. 1 and 3, the face opening 20 is divided into plural distribution openings formed of a driver center opening 201, a driver side opening 202, a passenger center opening 203, and a passenger side opening 204. FIG. 3 shows the air-conditioning unit 10 without an adjusting member 40 described later.

Not shown in figures, but the driver center opening 201 is connected to the driver center air outlet. The driver side opening 202 is connected to the driver side air outlet. The passenger center opening 203 is connected to the passenger center air outlet. The passenger side opening 204 is connected to the passenger side air outlet.

The blower is disposed in the air-conditioning case 12. The blower forms the flows of air flowing to the respective openings 20, 22, and 24.

The evaporator 14 is disposed in the air-conditioning case 12. The evaporator 14 is a cooler to cool the air flowing to each of the openings 20, 22, and 24. The evaporator 14 is a heat exchanger for cooling. The evaporator 14 evaporates a refrigerant, exchanges heat between the air and the refrigerant in a refrigeration cycle, and cools the air.

The heater core 16 and the PTC heater 18 are disposed in the air-conditioning case 12. The heater core 16 and the PTC heater 18 are heaters that heat air flowing to each of the openings 20, 22, and 24. The heater core 16 is a heat exchanger for heating that heats air by heat exchange between the air and engine cooling water. The PTC heater 18 is an assistant heater to heat the air having passed the heater core 16.

As shown in FIG. 2, the air-conditioning case 12 includes an air passage 26 through which air flows to each of the openings 20, 22, and 24. The air passage 26 includes an upper passage 28 disposed at an upper side of the air-conditioning case 12 and a lower passage 30 disposed at a lower side of the air-conditioning case 12. The upper passage 28 and the lower passage 30 are separated with an up-down partition wall 32 disposed in the air-conditioning case 12.

The upper passage 28 includes an upper part of the evaporator 14 and an upper part of the heater core 16. The upper passage 28 includes an upper warm air passage 281, an upper cool air passage 282, and an upper mix passage 283, which are disposed in a downstream side of the evaporator 14.

The upper warm air passage 281 guides a warm air generated by passing through the upper part of the heater core 16 to the upper mix passage 283. The upper cool air passage 282 guides a cool air generated by passing through the upper part of the evaporator 14 to bypass the upper part of the heater core 16 and flow to the upper mix passage 283. The upper mix passage 283 guides the mixed air of the warm air from the upper warm air passage 281 and the cool air from the upper cool air passage 282 to the face opening 20 and the defroster opening 22.

The lower passage 30 includes a lower part of the evaporator 14, a lower part of the heater core 16, and the PTC heater 18. The lower passage 30 includes a lower warm air passage 301, a lower cool air passage 302, and a lower mix passage 303, which are disposed in the downstream side of the evaporator 14.

The lower warm air passage 301 guides the warm air generated by passing the lower part of the heater core 16 to the lower mix passage 303. The lower warm air passage 301 includes the PTC heater 18. The air having passed through the lower part of the heater core 16 is heated by the PTC heater 18. The lower cool air passage 302 guides the cool air generated by passing through the lower part of the evaporator 14 to bypass the lower part of the heater core 16 and flow to the lower mix passage 303. The lower mix passage 303 guides the mixed air of the warm air from the lower warm air passage 301 and the cool air from the lower cool air passage 302 to the foot opening 24 shown in FIG. 1 through a communication passage 304. The lower mix passage 303 guides mixed air of the warm air from the lower warm air passage 301 and the cool air from the lower cool air passage 302 to the upper mix passage 283 through a communication opening 305. The communication opening 305 is formed at the up-down partition wall 32. The communication opening 305 is in communication with the upper mix passage 283 and the lower mix passage 303.

As shown in FIG. 2, the air-conditioning unit 10 includes an air mix door 34 and a blowing mode door 36.

The air mix door 34 is a temperature regulation door for regulating a temperature of the conditioned air by regulating mix ratio of the cool air and the warm air. The air mix door 34 includes an upper air mix door 341 and a lower air mix door 342. The upper air mix door 341 is located between the evaporator 14 and the heater core 16 in the upper passage 28. The lower air mix door 342 is located between the evaporator 14 and the heater core 16 in the lower passage 30.

The blowing mode door 36 selectively opens and closes the openings 20, 22, and 24. The blowing mode door 36 selectively opens and closes the openings 20, 22, and 24, so that a blowing mode such as a face mode and a foot mode is achieved. The blowing mode door 36 includes a face door 361, a defroster door 362, and a foot door 363. In this embodiment, the foot door 363 is integrally formed with a door 364 that opens and closes the communication opening 305.

In the face mode, the face door 361 opens the face opening 20. The defroster door 362 closes the defroster opening 22. The foot door 363 closes the communication passage 304 connected to the foot opening 24 and opens the communication opening 305. The air mix door 34 is positioned such that the temperature of the air from the face air outlet has a desired temperature.

The warm air from the upper warm air passage 281 and the lower warm air passage 301, and the cool air from the upper cool air passage 282 and the lower cool air passage 302 flow to the face opening 20 while being mixed in the upper mix passage 283 shown by arrows in FIG. 2. The airs passing through the driver center opening 201, the driver side opening 202, the passenger center opening 203, and the passenger side opening 204 are respectively blown out from the driver center air outlet, the driver side air outlet, the passenger center air outlet, and the passenger side air outlet into the cabin.

Two adjusting members 40 shown in FIG. 1 are described. As shown in FIG. 1, the air-conditioning unit 10 includes the two adjusting members 40. The two adjusting members 40 include a first adjusting member 40a and a second adjusting member 40b. The first adjusting member 40a is disposed to cover the driver center opening 201 and the second adjusting member 40b is disposed to cover the passenger center opening 203. The first adjusting member 40a adjusts the airflow from the driver center opening 201. The second adjusting member 40b adjusts the airflow from the passenger center opening 203. The first adjusting member 40a is integrally formed with the second adjusting member 40b. The first adjusting member 40a is fixed to cover the driver center opening 201. The second adjusting member 40b is fixed to cover the passenger center opening 203. The first adjusting member 40a may be fixed at an end of the duct connected to the driver center opening 201. The second adjusting member 40b may be fixed at an end of the duct connected to the passenger center opening 203.

Figure 4:
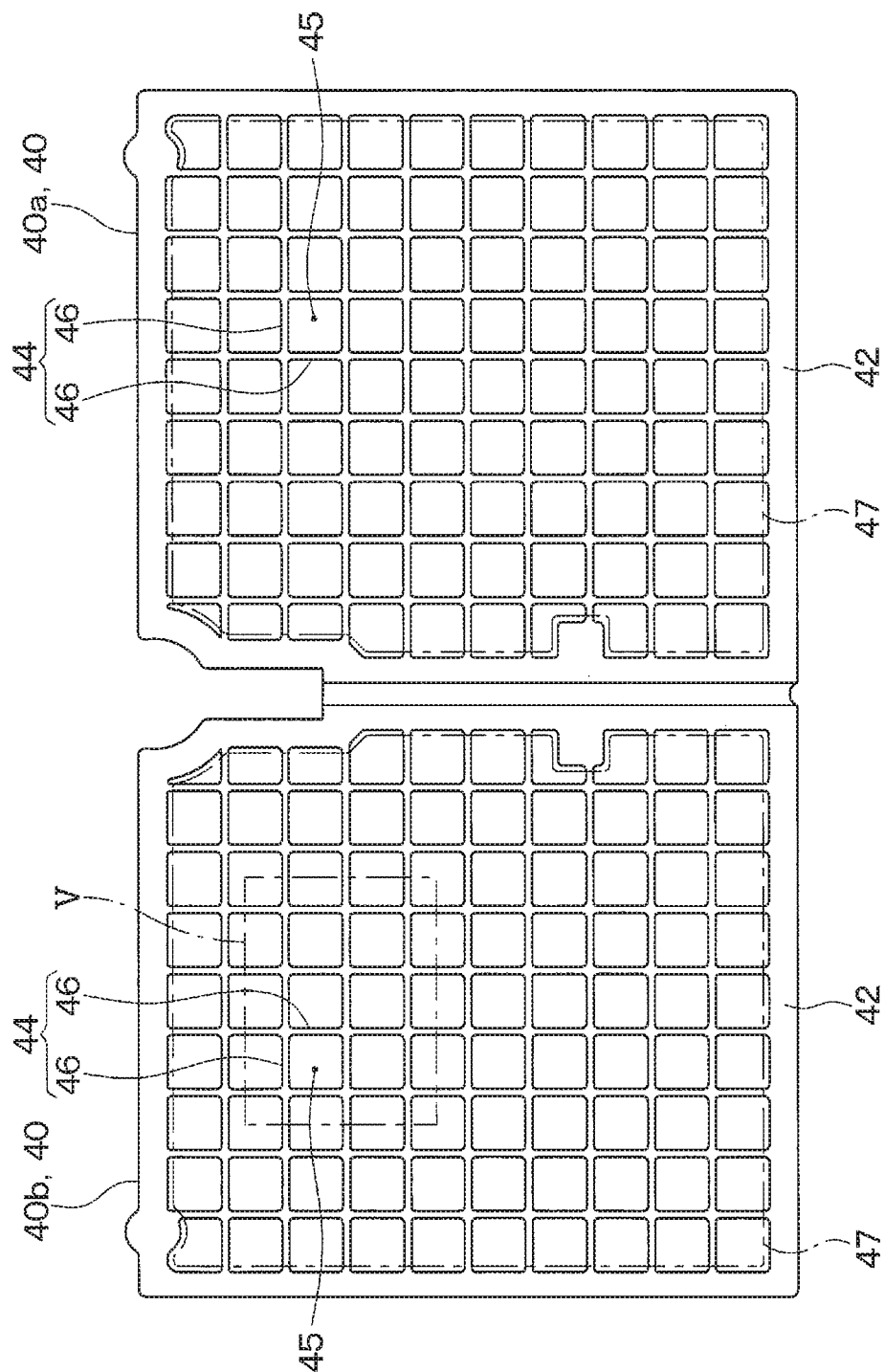
FIG. 4 is a front view of the adjusting member in accordance with the first embodiment.

As shown in FIG. 4, each of the two adjusting members 40 includes a frame 42 and a lattice 44. The frame 42 is located along an opening end of the openings that are covered with the adjusting member 40.

The lattice 44 is disposed in a region surrounded by the frame 42. The lattice 44 includes plural liner members 46 arranged to form plural gaps 45. The liner members 46 are a net member that forms the gaps 45. In a lattice region 47 where the lattice 44 is disposed, air can pass thorough the gaps 45. Thus, the gaps 45 are plural air passing parts through which air can pass. The liner members 46 are a partition to define the air passing parts. In this embodiment, all region surrounded by the frame 42 is the lattice region 47.

Figure 5:
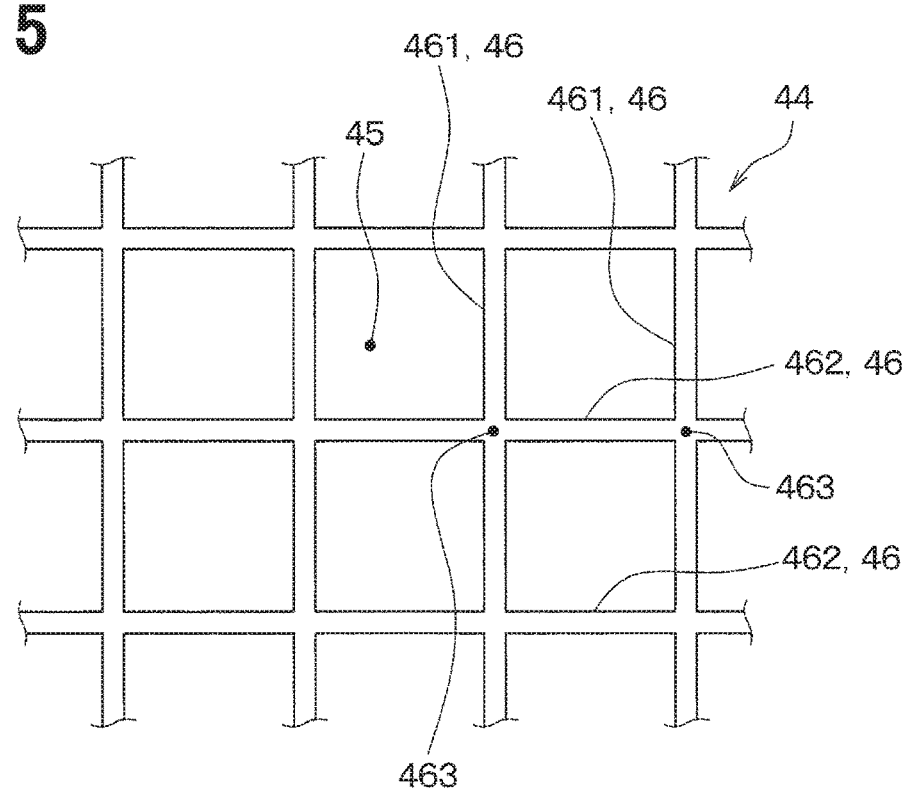
FIG. 5 is a magnified view of a V part in FIG. 4.

Specifically, as shown in FIG. 5, the liner members 46 includes plural first liner members 461 and plural second liner members 462. The first liner members 461 are arranged with a distance between each other. The second liner members 462 are arranged with a distance between each other. The first liner member 461 and the second liner member 462 are crossed each other. Thus, each of the shapes of the gaps 45 is rectangle.

Figure 6:
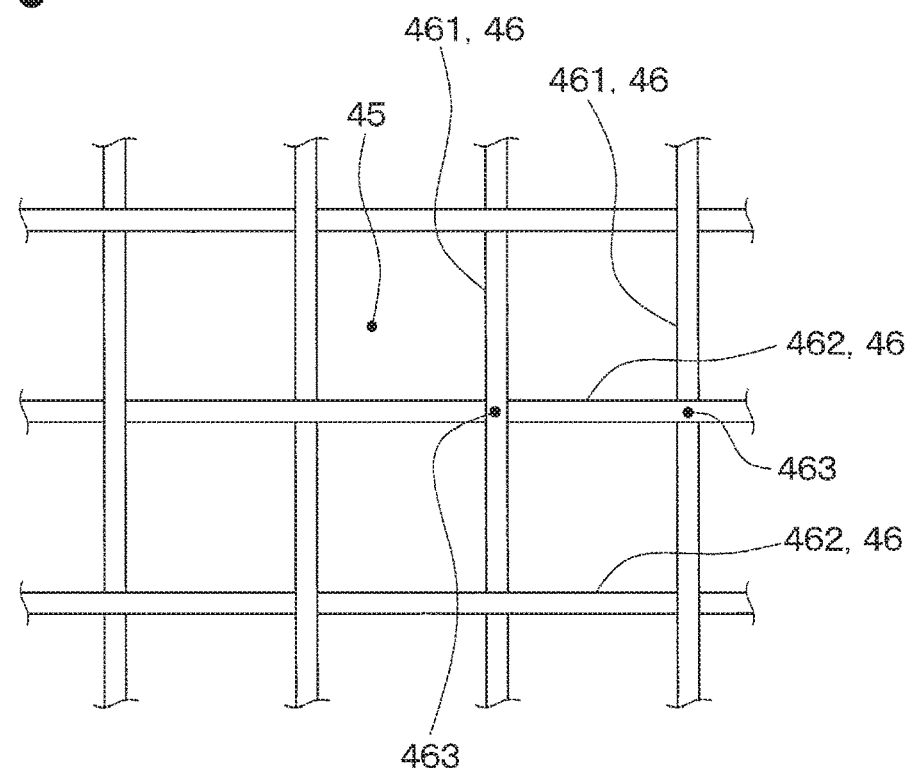
FIG. 6 is a front view of an adjusting member modified from the first embodiment.

The first liner member 461 and the second liner member 462 are crossed and combined at an intersection 463. As shown in FIG. 6, the first liner member 461 and the second liner member 462 may not be combined at the intersection 463. The first liner members 461 and the second liner members 462 may be woven.

The frame 42 and the lattice 44 are formed as an integrated molding made of resin. The integrated molding is a continuous molding without connecting parts. The frame 42 and the lattice 44 may not be made of resin.

The air-conditioning unit 10 in this embodiment includes the two adjusting members 40. The airflows passing through the driver center opening 201 and the passenger center opening 203 are adjusted by the lattice 44. Thus, the speed distribution of the airs blown from the driver center air outlet and the passenger center air outlet becomes uniform.

The lattice 44 can make resistance to the airflows passing through the driver center opening 201 and the passenger center opening 203. Thus, quantity of the airs blown from the driver center air outlet and the passenger center air outlet are reduced, which reduces the air speed.

According to the air-conditioning unit 10 in this embodiment, a noise of the blowing air is reduced compared to an air-conditioning unit without the two adjusting members 40.

In the air-conditioning unit 10 in this embodiment, a thickness of the liner members 46 and a distance between the liner members 46 adjacent each other may be changed. A target noise can be reduced by changing the thickness and the distance. In addition, a pressure loss of the airflow passing through each of the driver center opening 201 and the passenger center opening 203 can be regulated by changing the thickness and the distance.

Second Embodiment

Figure 7:
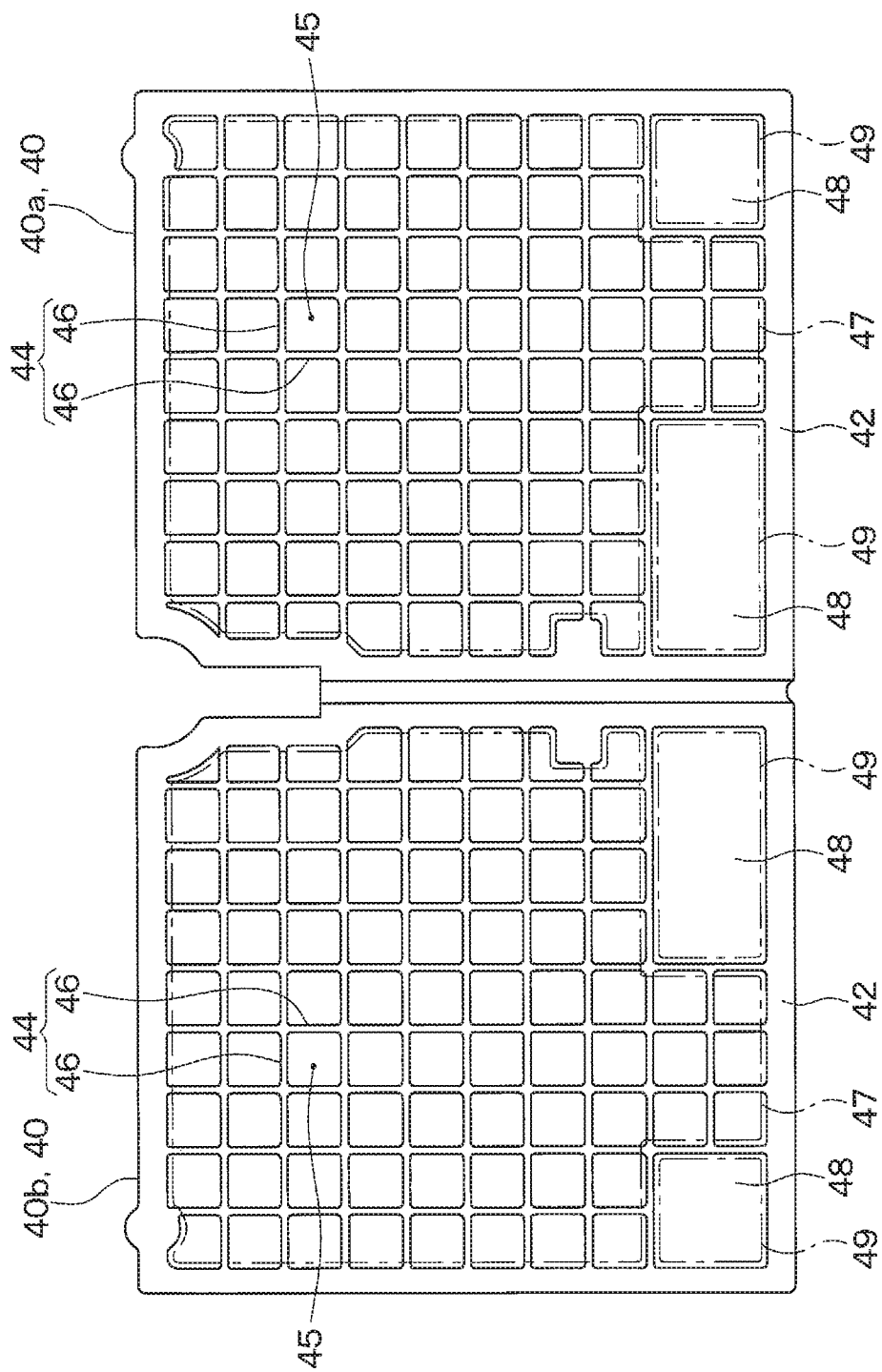
FIG. 7 is a front view of an adjusting member in accordance with a second embodiment.

As shown in FIG. 7, a second embodiment is a modification of the first embodiment, and the adjusting member 40 includes a baffle plate 48. The other structure of the air-conditioning unit 10 is the same in the first embodiment.

Each of the adjusting members 40 includes the frame 42, the lattice 44, and two of a baffle plate 48. The baffle plate 48 is a plate member for interfering the airflow.

The lattice 44 and the two baffle plates 38 are disposed in a region surrounded by the frame 42. The two baffle plates 48 are disposed in a peripheral part different from a center part in the region surrounded by the frame 42. The baffle plates 48 are disposed one-sided in the region surrounded by the frame 42. The lattice 44 is disposed in a region which is surrounded by the frame 42 and from which the two baffle plates 48 are excluded. The frame 42, the lattice 44 and the two baffle plates 48 are formed as an integrated molding made of resin. They may not be made of resin.

The lattice region 47 where the lattice 44 is disposed includes the gaps 45. A baffle plate region 49 where the baffle plates 48 are disposed does not include a gap. Thus, an opening ratio of the lattice region 47 is larger than an opening ratio of the baffle plate region 49. The opening ratio is a ratio of gaps formed by a member to a region where the member is disposed. When the member does not form the gap, the opening ratio is 0%. Thus, the lattice region 47 is a region having lower resistance to the airflow than the baffle plate region 49. The baffle plate region 49 is a region having higher resistance to the airflow than the lattice region 47. The lattice 44 is a low resistance member giving lower resistance to the airflow compared to the baffle plate 48. The baffle plate 48 is a high resistance member giving higher resistance to the airflow compared to the lattice 44.

In this embodiment, the lattice region 47 corresponds to the first region through which air flows. The baffle plate region 49 corresponds to the second region having higher resistance to the airflow than the first region. The baffle plate 48 corresponds to the high resistance member to give higher resistance to the airflow than resistance to the airflow in the first region. The lattice 44 corresponds to the low resistance member to give lower resistance to the airflow than resistance to the airflow in the second region.

In this embodiment, an entire area of the lattice region 47 including the lattice 44 and the gaps 45 is more than half of the entire opening area of the openings 201 and 203 covered with the adjusting member 40. The lattice region 47 is a continuous region. An area of the baffle plate 48 disturbing the airflow is larger than an average area of each of the gaps 45.

In this embodiment, the same effect can be obtained with the first embodiment with the lattice 44. According to this embodiment, an effect described below is also obtained.

Recently, the air-conditioning unit 10 is downsized, which causes downsizing of the upper mix passage 283 and the lower mix passage 303. The upper mix passage 283 and the lower mix passage 303 are spaces where the cool air and the warm air are mixed. In case that the adjusting member 40 is not disposed to cover the driver center opening 201, in the face mode, the warm air and the cool air pass through the driver center opening 201 without mixed plenty. The driver center opening 201 includes a region through which the warm air passes and a region through which the cool air passes. The warm air and the cool air having passed through the driver center opening 201 are blown from the driver center air outlet thorough the duct as they are. This causes a large temperature variation of the air blown from the driver center air outlet. Thus, the temperature variation in the driver center air outlet is large. The large temperature variation means that the difference between a minimum temperature and a maximum temperature is large. Similarly, in the case that the passenger center opening 203 is not covered with the adjusting member 40, the temperature variation in the passenger center air outlet is large.

In contrast, the air-conditioning unit 10 in this embodiment includes the adjusting member 40 covering the driver center opening 201. The adjusting member 40 in this embodiment includes the baffle plate 48. The baffle plate region 49 has higher resistance to the airflow compared to the lattice region 47 without the baffle plate 48, in the region surrounded by the frame 42. Thus, the airflow passing through the driver center opening 201 can be disturbed.

In this embodiment, the baffle plate 48 is disposed in the region of the driver center opening 201 through which the warm air passes in the case where the adjusting member 40 is not disposed. When the warm air and the cool air pass through the driver center opening 201, the baffle plate 48 guides the warm air to the region through which the cool air passes. According to this, the warm air and the cool air can be mixed. The temperature variation of the air in the driver center air outlet can be reduced.

In the air-conditioning unit 10 in this embodiment, the passenger center opening 203 includes the adjusting member 40. Thus, the temperature variation of the air in the passenger center air outlet can be reduced.

In a comparison case, the upper mix passage 283 and the lower mix passage 303 are small and the adjusting member 40 is not disposed to cover the driver center opening 201 and the passenger center opening 203. In this case, in the face mode, the warm air passes more thorough the driver center opening 201 and the passenger center opening 203 than the driver side opening 202 and the passenger side opening 204. Thus, the temperature of the air blown from the driver center air outlet and the passenger center air outlet is higher than the temperature of the air blown from the driver side air outlet and the passenger side air outlet. When the air having the same temperature target is blown form the plural air outlets, the temperature difference of the airs blown from different air outlets is large. To say, the temperature variation of airs blown from different air outlets is large.

In contrast, in the air-conditioning unit 10 in this embodiment, the adjusting member 40 is disposed to cover each of the driver center opening 210 and the passenger center opening 203 in the face opening 20. The resistance to the warm air is higher in this embodiment compared to a case where the adjusting member 40 is not disposed to cover the driver center opening 201 and the passenger center opening 203. Thus, the quantity of the warm airs passing through the driver center opening 201 and the passenger center opening 203 is decreased and the quantity of the warm airs passing through the driver side opening 202 and the passenger side opening 204 is increased. The mix ratio of the warm air and the cool air passing through the driver center opening 201, the driver side opening 202, the passenger center opening 203, and the passenger side opening 204 becomes uniform. The temperature of the air blown from each of the driver center air outlet, the driver side air outlet, the passenger center air outlet, and the passenger side air outlet becomes uniform.

In this embodiment, the baffle plate 48 regulates resistance to the airflow passing through the driver center opening 201 and the passenger center opening 203. By regulating the resistance, the flow of the warm air in the openings 201, 202, 203, and 204 are regulated and the mix ratio of the cool air and the warm air is regulated. As a result, the temperature variation of airs blown from different air outlets including the driver center opening, the passenger center opening, the driver side opening, and the passenger side opening is decreased.

The experimental results measured by the inventor are shown in FIG. 8. FIG. 8 shows the measurement results of the temperature variation of air in each of the openings and the temperature variation of airs blown from the different air outlets. These results are compared between an air-conditioning unit in a comparison example and the air-conditioning unit 10 in this embodiment. The air-conditioning unit in the comparison example is different from the air-conditioning unit 10 in this embodiment at a point that the two adjusting members 40 of the air-conditioning unit in the comparison example do not have the two baffle plates 48. The other structure of the air-conditioning unit in the comparison example is the same with the air-conditioning unit 10 in this embodiment. The temperature variation in the air outlet is the temperature variation of air in one face air outlet, or in the driver center air outlet. The temperature variation between air outlets is a temperature variation of the four face air outlets including the driver center air outlet, the passenger center air outlet, the driver side air outlet, and the passenger side air outlet.

From the result shown in FIG. 8, according to the air-conditioning unit 10 in this embodiment, the temperature variation in the air outlet is reduced and the temperature variation between the air outlets is reduced compared to the air-conditioning unit in the comparison example.

In the air-conditioning unit 10 in this embodiment, the two adjusting members 40 are produced separately from the air-conditioning case 12. Thus, the reduction of the temperature variation is achieved without altering a shape of the air-conditioning case 12, according to a vehicle model having the air-conditioning unit 10, but with altering a number or a position of the baffle plate 48 of the adjusting member 40.

In the air-conditioning unit 10 in this embodiment, the two baffle plates 48 are disposed in the peripheral part of the region surrounded by the frame 42. The region surrounded by the frame 42 corresponds to an opening region of the opening. In a case without the adjusting member 40, the speed of the air passing through the opening is higher at the center in the opening region of the opening. The speed of the air passing through the opening is lower at the peripheral part in the opening region of the opening. Thus, in this embodiment, the baffle plate 48 is disposed at a region where the air speed is low in the speed distribution of the air passing through the opening without the adjusting member 40. According to this, the temperature variation can be reduced while the air quantity is kept sufficiently and the noise is reduced.

A position and a number of the baffle plate 48 are not limited to this embodiment. The position and a number of the baffle plate 48 can be altered appropriately. For example, the baffle plate 48 may be disposed at the center in the region surrounded by the frame 42. By altering the position of the baffle plate 48 and the area that is occupied with the baffle plate 48 in the region surrounded by the frame 42, the temperature distribution of the air blown from the air outlet is regulated.

In this embodiment, the lattice 44 and the baffle plate 48 are formed as the integrated molding. However, the lattice 44 and the two baffle plates 48 may be formed as different members and connected with each other.

Third Embodiment

Figure 9:
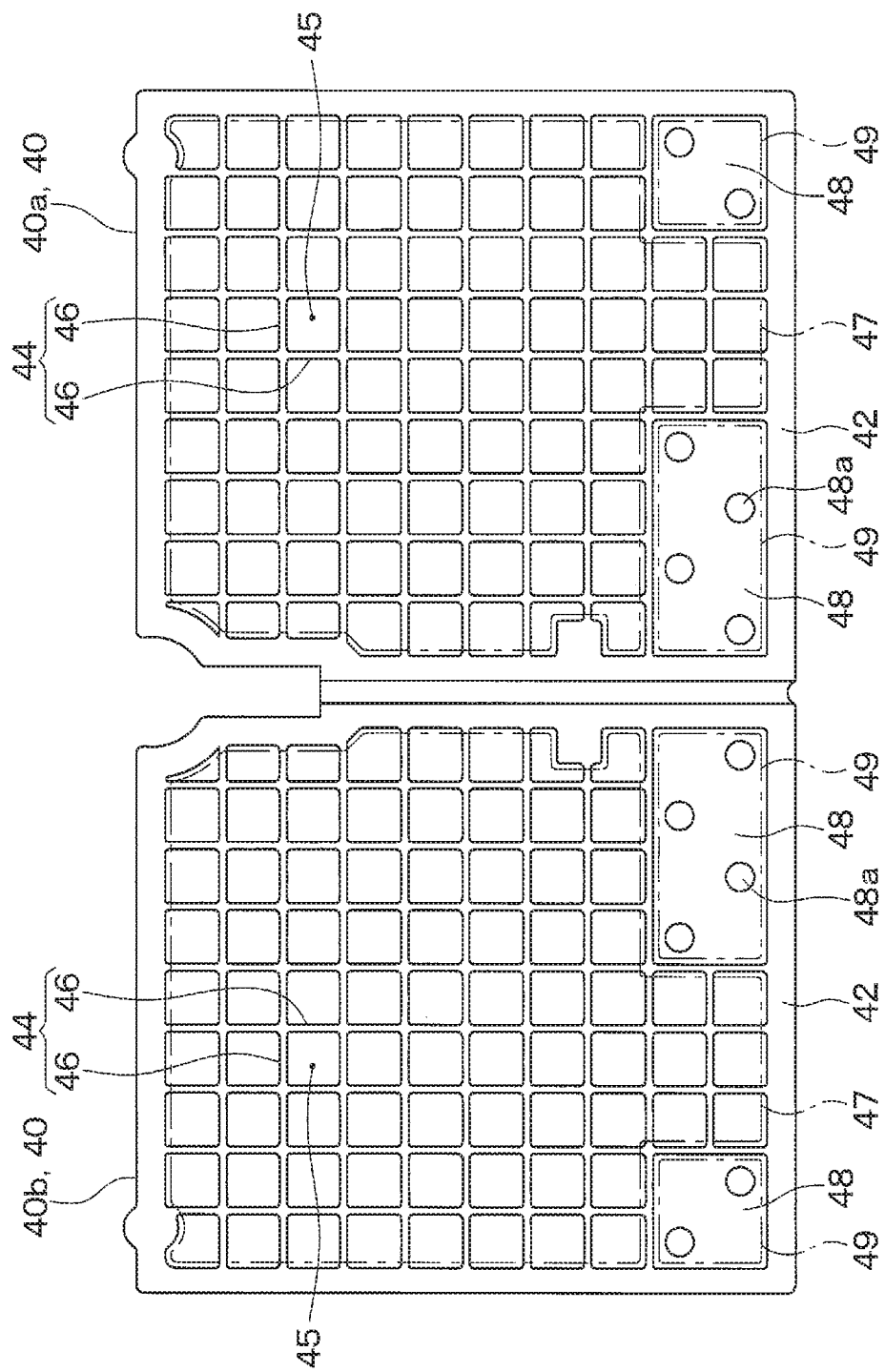
FIG. 9 is a front view of an adjusting member in accordance with a third embodiment.

As shown in FIG. 9, in the third embodiment, the two baffle plates 48 of the adjusting member 40 have plural openings 48a. The other structure of the air-conditioning unit 10 is the same in the first embodiment.

The baffle plate 48 may have the openings 48a. The opening 48a may be one. By forming the one or plural openings 48a at the baffle plate 48, the resistance to the airflow in the baffle plate region 49 is reduced. The resistance to the airflow in the opening covered with the adjusting member 40 is regulated.

Fourth Embodiment

Figure 10:
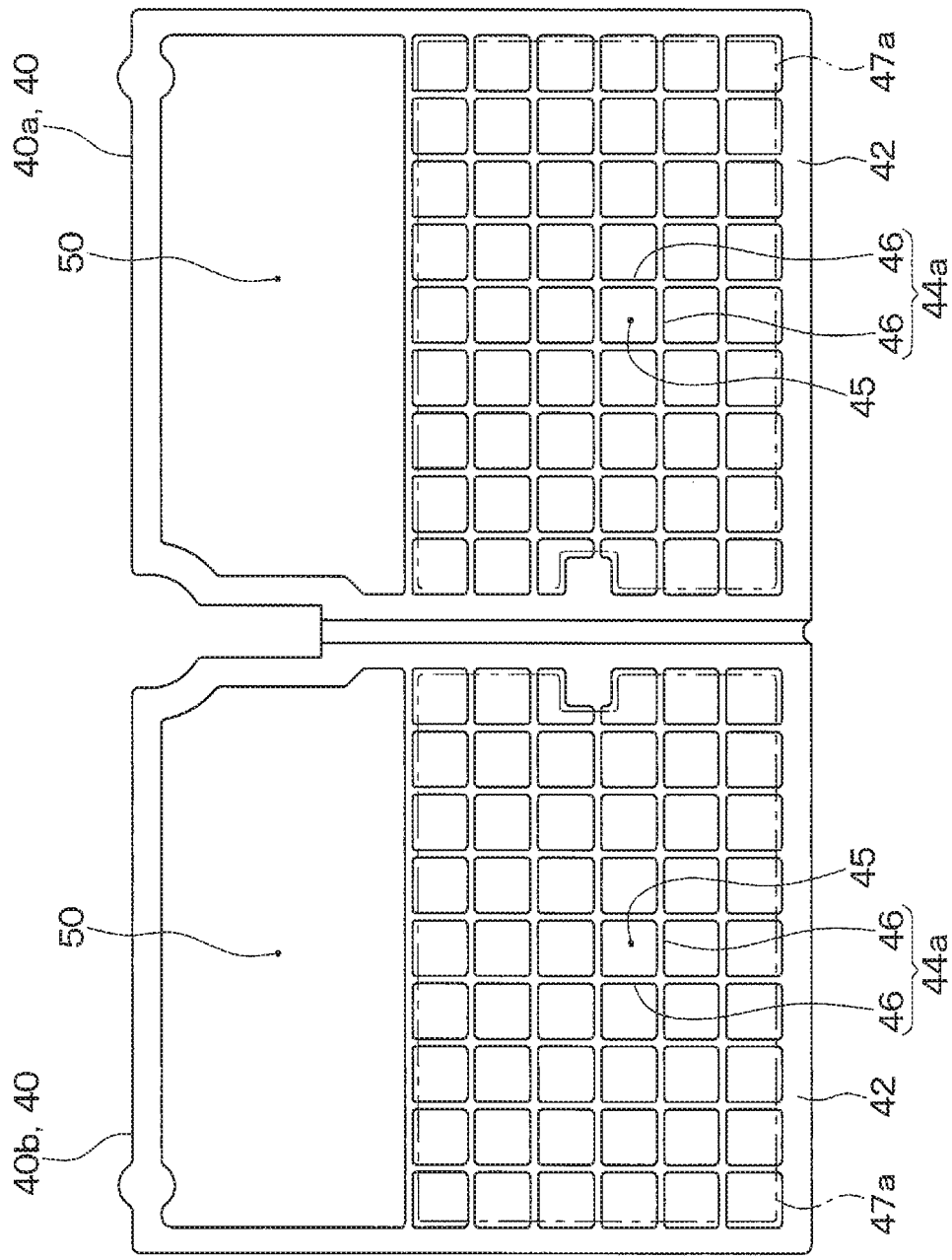
FIG. 10 is a front view of an adjusting member in accordance with a fourth embodiment.

As shown in FIG. 10, in the fourth embodiment, the shape of the two adjusting member 40 is different from the first embodiment. The other structure of the air-conditioning unit 10 is the same in the first embodiment.

Each of the two adjusting members 40 includes the frame 42 and a lattice 44a. The lattice 44a is made similarly to the lattice 40 in the first embodiment, but the lattice 44a is disposed in a part of the region surrounded by the frame 42. A region which is surrounded by the frame 42 and from which a lattice region 47a is excluded is a cavity. In other words, in each of the two adjusting members 40, a region which is surrounded by the frame 42 is defined by the lattice region 47a and the cavity 50. The lattice region 47a is a region where the lattice 44a is disposed. The cavity 50 is a region where no member is disposed.

In this embodiment, the same effect in the first embodiment is obtained with the lattice 44. In addition, the opening ratio of the cavity 50 is higher than the opening ratio of the lattice region 47a. Thus, the cavity 50 is a region where the resistance to the airflow is lower than the lattice region 47a. The lattice region 47a is a region where the resistance to the airflow is higher than the cavity 50. The lattice 44a is the high resistance member that has higher resistance to the airflow compared to the cavity 50. Thus, the same effect in the first embodiment is obtained in this embodiment.

In this embodiment, the cavity 50 corresponds to the first region through which air flows. The lattice region 47a corresponds to the second region having higher resistance to the airflow than the first region. The lattice 44a corresponds to the high resistance member to give higher resistance to the airflow than the resistance to the airflow in the first region.

Fifth Embodiment

Figure 11:
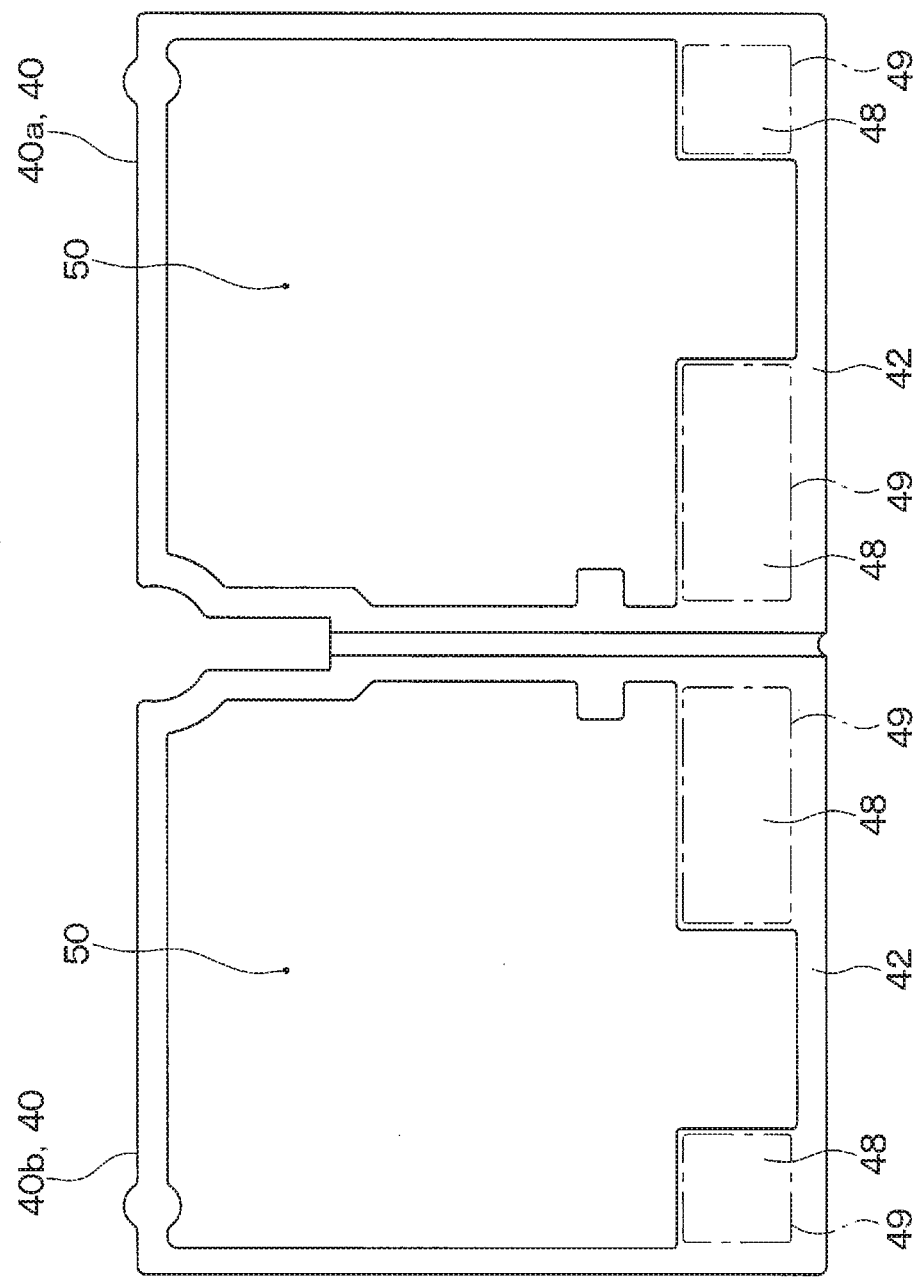
FIG. 11 is a front view of an adjusting member in accordance with a fifth embodiment.

As shown in FIG. 11, in the fifth embodiment, the shapes of the two adjusting members 40 are different from the first embodiment. The other structure of the air-conditioning unit 10 is the same in the first embodiment.

Each of the two adjusting members 40 includes a frame 42 and the two baffle plates 48. The two baffle plates 48 are disposed in a part of the region surrounded by the frame 42. The region surrounded by the frame 42 is defined by the baffle plate region 49 and the cavity 50. In other words, in each of the two adjusting members 40, the cavity 50 is formed in the region surrounded by the frame 42 except for the baffle plate region 49. The cavity 50 is a region where no member is disposed.

In this embodiment, the opening ratio of the cavity 50 is higher than the opening ratio of the baffle plate region 49. The cavity 50 is a region having lower resistance to the airflow than the baffle plate region 49. The baffle plate region 49 is a region having higher resistance to the airflow than the cavity 50. The baffle plate 48 is the high resistance member to give higher resistance to the airflow compared to the cavity 50. In this embodiment, the same effect in the second embodiment is obtained.

In this embodiment, the cavity 50 corresponds to the first region through which air flows. The baffle plate region 49 corresponds to the second region having higher resistance than the first region. The baffle plate 48 corresponds to the high resistance member to give higher resistance to the airflow than the resistance to the airflow in the first region.

Sixth Embodiment

Figure 12:
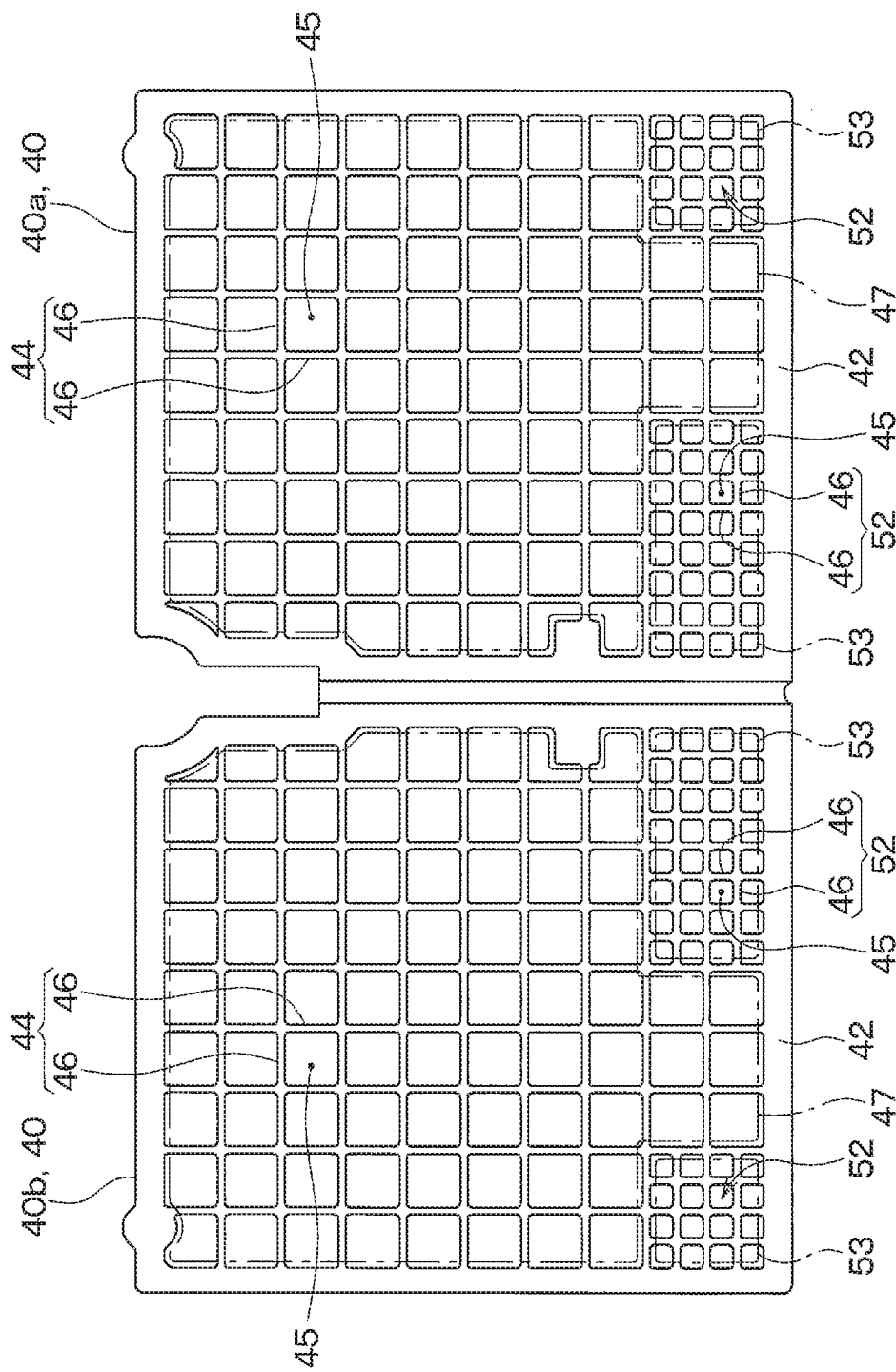
FIG. 12 is a front view of an adjusting member in accordance with a sixth embodiment.

As shown in FIG. 12, in the sixth embodiment, the shapes of the two adjusting members 40 are different from the first embodiment. The other structure of the air-conditioning unit 10 is the same in the first embodiment.

Each of the two adjusting members 40 includes the frame 42, a first lattice 44, and a second lattice 52. The first lattice 44 and the second lattice 52 are disposed in the region surrounded by the frame 42. The first lattice 44 is the same with the lattice 44 in the second embodiment. A first lattice region where the first lattice 44 is disposed is the same with the lattice region 47 in the second embodiment.

The second lattice 52 includes plural liner members 46 arranged to form the gaps 45 as with the first lattice 44. The distance of the liner members 46 adjacent each other in the second lattice 52 is narrower than in the first lattice 44. The liner members 46 adjacent each other is arranged densely in the second lattice 52. The gaps 45 in the second lattice 52 are smaller than in the first lattice 44.

In this embodiment, the same effect in the first embodiment and the second embodiment is obtained with disposing the first lattice 44 and the second lattice 52. In addition, the opening ratio of the first lattice region 47 is higher than the opening ratio of a second lattice region 53 where the second lattice 52 is disposed. The first lattice region 47 is a region having lower resistance to the airflow than the second lattice region 53. The second lattice region 53 is a region having higher resistance to the airflow than the first lattice region 47. The first lattice 44 is the low resistance member to give lower resistance to the airflow compared to the second lattice 52. The second lattice 52 is the high resistance member to give higher resistance to the airflow compared to the first lattice 44. In this embodiment, the same effect in the second embodiment is obtained.

In this embodiment, the first lattice region 47 corresponds to the first region through which air flows. The second lattice region 53 corresponds to the second region having higher resistance to the airflow than the first region. The second lattice 52 corresponds to the high resistance member to give higher resistance to the airflow than the resistance to the airflow in the first region. The first lattice 44 corresponds to the low resistance member to give lower resistance to the airflow than the resistance to the airflow in the second region.

OTHER EMBODIMENTS

In the first to the fourth, and the sixth embodiments, the shape of the gaps 45 formed by the lattice 44, the first lattice 44 and the second lattice 52 is rectangle. However, each shape of the gaps may be other shape except for rectangle.

Figure 13:
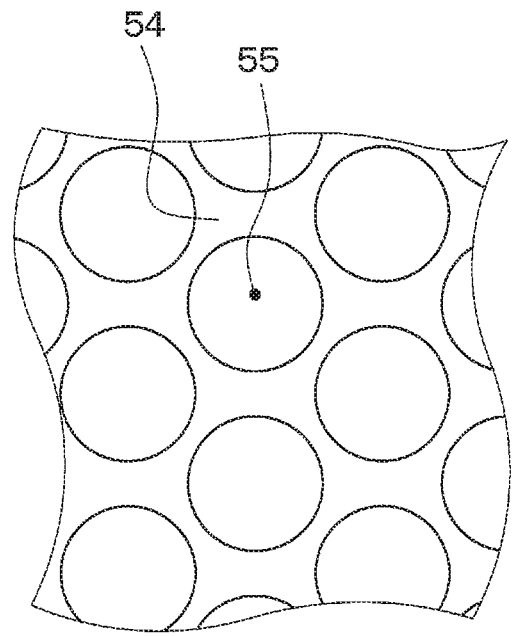
FIG. 13 is a part view of an adjusting member in accordance with other embodiment.

For example, the lattice 44, the first lattice 44, and the second lattice 52 may be altered to a net member 54 forming the circular gaps 55 as shown in FIG. 13. In this case, the circular gaps 55 are plural air passing parts through which air passes. The net member 54 is a partition that defines the air passing parts.

Figure 14:
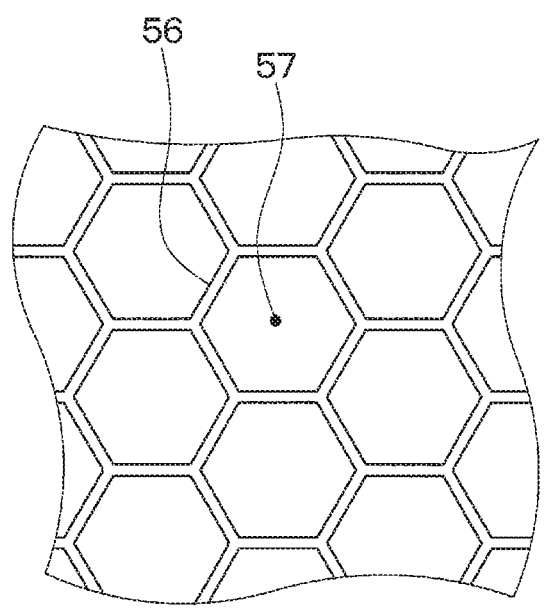
FIG. 14 is a part view of an adjusting member in accordance with other embodiment.

As shown in FIG. 14, the lattice 44, the first lattice 44, and the second lattice 52 may be altered to a net member 56 forming the hexagonal gaps 57. In this case, the hexagonal gaps 57 are plural air passing parts through which air passes. The net member 56 is a partition that defines the air passing parts.

In the above-mentioned embodiments, two openings 201, 203 in the four openings 201, 202, 203 and 204 of the face openings 20 have the adjusting members 40. However, this is not limited to this case. The adjusting members 40 may be disposed to cover one of the four openings 201, 202, 203, and 204. For example, the adjusting members 40 may be disposed to cover all of the four openings 201, 202, 203, and 204. In this case, it is preferred that the value of the resistance to the airflow is different between the center openings 201, 203, and the side openings 202, 204 as with the second embodiment. Thus, the temperature variation of airs blown from different air outlets is reduced as with the second embodiment.

In the above-mentioned embodiments, the adjusting member 40 is disposed to cover the face opening 20. However, the adjusting member 40 may be disposed to cover other openings. Thus, the same effect in the above-mentioned embodiments is obtained.

It should be appreciated that the present disclosure is not limited to the embodiments described above and can be modified appropriately within the scope of the appended claims. The present disclosure includes various examples of modification and modification in the range of equivalence. The embodiments above are not irrelevant to one another and can be combined appropriately unless a combination is obviously impossible. In the respective embodiments above, it goes without saying that elements forming the embodiments are not necessarily essential unless specified as being essential or deemed as being apparently essential in principle. In a case where a reference is made to the components of the respective embodiments as to numerical values, such as the number, values, amounts, and ranges, the components are not limited to the numerical values unless specified as being essential or deemed as being apparently essential in principle. Also, in a case where a reference is made to the components of the respective embodiments above as to materials, shapes and positional relations, the components are not limited to the materials, the shapes and the positional relations unless explicitly specified or limited to particular materials, shapes and positional relations in principle.

According to the first aspect represented by a part or all of the above mentioned embodiments, an air-conditioning unit includes an air-conditioning case, a cooler, a heater, and an adjusting member. The adjusting member includes a first region through which air flows and a second region having a higher resistance to the airflow than the first region.

According the second aspect, the second region includes a high resistance member to give higher resistance to the airflow than the first region. Thus, the resistance to the airflow in the second region is higher than the resistance to the airflow in the first region.

According to the third aspect, the first region includes a low resistance member to give lower resistance to the airflow than the second region. The low resistance member can be disposed in the first region.

According to the fourth aspect, the low resistance member is a partition that defines plural air passing parts through which air flows. The high resistance member is a plate member having a part to disturb the airflow. Specifically, the members described in the fourth embodiment can be used as the low resistance member and the high resistance member.

According to this, the partition adjusts the airflow passing through the opening. Thus, the speed distribution of the air blown from the air outlets disposed in the cabin becomes uniform. In addition, the partition gives resistance to the airflow passing through the opening. Thus, the quantity of the air blown from the air outlet into the cabin is reduced and the air speed is reduced.

From these results, the noise of the blowing air is reduced compared to the case without the adjusting member.

According to the fifth aspect, an air-conditioning unit includes an air-conditioning case and an adjusting member. The adjusting member includes a partition that defines plural air passing parts through which air flows.

What is claimed is:

1. An air-conditioning unit comprising:
an air-conditioning case including an opening through which air flows;
a cooler disposed in the air-conditioning case and configured to cool air flowing to the opening;
a heater disposed in the air-conditioning case and configured to heat air flowing to the opening; and
an adjusting member disposed to cover the opening and adjusting airflow passing through the opening, wherein
the adjusting member is a member produced separately from the air-conditioning case,
the adjusting member consists of:
  a frame that has a rectangular shape;
  a lattice that divides a region surrounded by the frame into a plurality of rectangular-shaped holes; and
  a plate member that has a rectangular shape and defines no holes,
the adjusting member includes a first region through which air flows and a second region having higher resistance to the airflow than the first region,
the second region is the plate member,
the first region is the lattice,
the lattice is disposed not to overlap with the plate member,
the plate member is disposed at a downstream end of the opening,
an area of the plate member is greater than an opening area of each of the plurality of rectangular-shaped holes, and
the plate member is located in contact with and along a corner of the frame.

2. An air-conditioning unit for a vehicle comprising:
an air-conditioning case including a face opening, a defroster opening, and a foot opening through which air flows, the face opening being divided into a plurality of distribution openings for a driver and a passenger;
a cooler disposed in the air-conditioning case and configured to cool air flowing to the plurality of distribution openings;
a heater disposed in the air-conditioning case and configured to heat air flowing to the plurality of distribution openings; and
an adjusting member disposed to cover one of the plurality of distribution openings, the one of the plurality of distribution openings being located at a center area of the face opening in a lateral direction of the vehicle, wherein
the adjusting member consists of:
  a frame that has a rectangular shape and is located along an opening end of the one of the plurality of distribution openings;
  a lattice that is disposed in a region surrounded by the frame, the lattice including a plurality of linear members arranged to form a plurality of rectangular-shaped holes through which air is able to pass; and
  a plate member disposed in the region surrounded by the frame and configured to interfere air from passing therethrough, the plate member having a rectangular shape and defining no holes, and
the plate member has a higher resistance to a flow of air flowing through the adjusting member than the lattice,
an area of the plate member is greater than an opening area of each of the plurality of rectangular-shaped holes, and
the plate member is located to be in contact with and along a corner of the frame.

3. The air-conditioning unit according to claim 1, wherein
the lattice is disposed in an area outside of the plate member.

4. The air-conditioning unit according to claim 1, wherein
the plate member includes a first plate member and a second plate member,
the corner includes a first corner and a second corner,
the first plate member is disposed apart from the second plate member, and
the first plate member is located to be in contact with and along the first corner of the frame and the second plate member is located to be in contact with and along the second corner of the frame.

5. The air-conditioning unit according to claim 4, wherein
the first corner and the second corner are adjacent to each other.

6. The air-conditioning unit according to claim 1, wherein
the lattice includes a plurality of vertically extending linear members and a plurality of horizontally extending linear members.

7. The air-conditioning unit according to claim 6, wherein
the plate member is surrounded between the frame, one of the plurality of vertically extending linear members, and one of the plurality of horizontally extending linear members.

* * * * *